United States Patent [19]

Spector

[11] Patent Number: 5,141,438

[45] Date of Patent: Aug. 25, 1992

[54] ART CRAFT KIT

[76] Inventor: Donald Spector, 380 Mountain Rd., Union City, N.J. 07087

[21] Appl. No.: 694,373

[22] Filed: May 1, 1991

[51] Int. Cl.⁵ ............................................. G09B 11/04
[52] U.S. Cl. ..................................... 434/87; 434/84; 434/85
[58] Field of Search ........................ 434/81, 84, 85, 87, 434/88, 89, 96, 97, 98; 446/147, 148, 149

[56] References Cited

U.S. PATENT DOCUMENTS

| | | | |
|---|---|---|---|
| 1,065,562 | 6/1913 | Spoerer | 446/149 |
| 2,946,137 | 7/1960 | Worth et al. | 446/146 X |
| 4,176,473 | 12/1979 | Rae | 446/147 X |
| 4,811,951 | 3/1989 | Dorsey-Zinn et al. | 273/157 R |
| 4,931,017 | 6/1990 | Mann | 434/87 |

FOREIGN PATENT DOCUMENTS 133556  10/1919  United Kingdom ................ 434/98

*Primary Examiner*—Gene Mancene
*Assistant Examiner*—L. Thomas

*Attorney, Agent, or Firm*—Michael Ebert

[57] ABSTRACT

An art craft kit which makes it possible for a child to reproduce a painting, a map, or other multi-colored artwork printed on a master sheet having a pressure-sensitive adhesive backing, the master sheet being adhered to the face of a blank canvas or other copy sheet. The printed artwork is dissected into stencil segments, the periphery of each segment being defined by a contoured line of perforations. To reproduce the artwork, the child runs a pointed tool along the contoured line defining a selected segment, thereby cutting this line and separating the segment which is then removed from the master sheet to expose a corresponding blank segment on the copy sheet. Using the removed stencil segment as a guide, the child colors in the blank segment of the copy sheet to match as best he can, the portion of the artwork appearing on the removed segment. This operation is subsequently repeated until all stencil segments on the master sheet are removed and the artwork is reproduced on the copy sheet.

3 Claims, 1 Drawing Sheet

U.S. Patent     Aug. 25, 1992     5,141,438

ART CRAFT KIT

BACKGROUND OF INVENTION

1. Field of Invention

This invention relates generally to an art craft technique making it possible for a child to reproduce on a blank copy sheet a multi-colored artwork printed on a master sheet, and more particularly to an art craft kit in which the artwork on the master sheet is dissected into stencil segments which are copied by the child, in sequence, on the blank copy sheet.

2. Status of Prior Art

A stencil is a cardboard or metal sheet that is die-cut or perforated to define lettering or a design. Ink or paint is forced through the stencil openings onto a surface to be printed.

An ancient technique practiced in Japan for creating works of art makes use of stencils having openings in various configurations which are placed in sequence on a blank canvas or paper copy sheet. Inks, paints or pastels are used to apply color to the copy sheet through the stencils. The positions at which the stencils are placed on the canvas and the sequence in which this is done are matters of aesthetic judgment.

In practice, hundreds and sometimes thousands of stencil forms are sequentially added to a blank canvas or other copy sheet to create an original artworks. Some of these rank as masterpieces. However, it takes many years for an artist to perfect this Japanese stencil technique, and the creation of an original artwork by this technique is a slow, time-consuming process.

The concern of the present invention is with the untrained child who lacks craft skills, yet enjoys painting colored pictures with crayons, paints or inks. The lack of craft skills rarely stands in the way of a child who has creative impulses. However, a picture painted by a child on canvas or paper is almost invariably primitive, for a child is only able to roughly approximate human and other complex forms.

In order to make it possible for an untrained child to paint a picture which exhibits a high order of professional skill, the common practice is to provide the child with a paint-by-the-numbers kit. What the child is given to paint is a printed black-and-white reproduction of a multi-colored original picture executed by a professional artist. The black and white printed picture is divided into outlined segments, each specifically identified by a number. The child is provided with a guide in which each number is listed against a particular color. If, therefore, number 27 is red, then the segment numbered 27 is to be painted red by the child.

In painting by the numbers, a child acquires no craft skills, for all he is doing is painting over an existing artwork to which he makes no contribution. It does not take long before the typical child becomes bored with this technique.

Ideally, an art craft kit for children should serve two equally important functions. First, it must have play or entertainment value which will sustain the interest of the child. Second, it must also have educational or teaching value so that in playing with the kit the child acquires useful craft skills. Art craft kits which make use of a painting-by-the-numbers technique fall far short of this ideal.

The classical way to teach the craft of painting to an apprentice is by imitation. The student is provided with an original painting executed by a master, or a good copy of this painting, and the apprentice is called upon to reproduce this painting, as best he can, on canvas or paper.

In his first try, the apprentice will experience great difficulty in making a recognizable reproduction of the original painting. But as he continues to make reproductions, the apprentice gains an appreciation of draftsmanship, perspective, gradations of color, and all other craft aspects of the original, and in time he becomes more skillful in the craft of painting The classical technique continues to be practiced. Thus in many art museums, one sees students each standing at an easel placed in front of a painting masterpiece, the student seeking to reproduce this masterpiece. However, this technique is altogether unsuitable for a child who has had no formal training in drawing and is inexperienced in the use of paints.

Should one show a child a painting executed by a professional painter and ask him to reproduce it, his copy will bear little resemblance to this painting, and with repeated attempts, there would be little improvement. The reason for this is that an untrained child is unable to cope with the totality of the painting and doesn't know where to begin. In the classical technique of reproducing a painting, it is first necessary to create on the copy sheet a cartoon or general outline of the painting to establish its overall pattern. To do this is far beyond the ability of a typical child.

This is why it has heretofore been the practice to provide a child with a paint-by-the-numbers art craft kit, for with this approach the original art work is dissected into small segments which the child can cope with. But as explained above, the child acquires little skill in coloring in by the numbers an existing artwork.

SUMMARY OF INVENTION

In view of the foregoing, the main object of this invention is to provide a technique and art craft kit for practicing this technique, which makes it possible for a child to reproduce on a blank canvas or copy sheet with some degree of fidelity a multi-colored artwork printed on a master sheet which overlies the copy sheet, the artwork on the master sheet being dissected into removable stencil segments which are copied in sequence on the copy sheet.

A significant advantage of the invention is that the skill required to reproduce on the copy sheet the small portion of the artwork contained in a stencil segment does not exceed that possessed by the typical child. Consequently the reproduction that results when all of the stencil segments are copied is a fair reproduction of the entire artwork. But it does require some degree of skill to make a good copy of the portion of the total artwork that appears on a stencil segment on a corresponding blank segment of the copy sheet. And as the child continues to play with this art craft kit, he sharpens this skill.

This technique, therefore, not only has play value, but it also enhances the craft skills of the child who is required to cut out each stencil segment and to color in on a corresponding blank segment on a copy sheet the colors and other details which appear on the stencil segment.

The invention is not limited to artwork in the form of paintings, for the dissected artwork on the master sheet may be a multi-colored map in which each state or country is in a different color. Or it may be a colored chart showing the internal organs of a human body or any other multi-colored drawing used as a teaching aid for a particular subject of study. Hence in the process of recreating the dissected artwork on a copy sheet, the child acquires a knowledge of the components which make up the drawing and their relative positions. Thus in the case of a map of the United States, the child, in detaching stencil segments from the master sheet, each representing a particular state and each having a distinctive color, is not only taught the geographical shape and relative size of each state, but also where, say, Florida is in respect to Nevada.

Briefly stated, these objects are attained in an art craft kit which makes it possible for a child to reproduce a painting, a map, or other multi-colored artwork printed on a master sheet having a pressure-sensitive adhesive backing, the master sheet being adhered to the face of a blank canvas or other copy sheet. The printed artwork is dissected into stencil segments, the periphery of each segment being defined by a contoured line of perforations. To reproduce the artwork, the child runs a pointed tool along the contoured line defining a selected segment, thereby cutting this line and separating the segment which is then removed from the master sheet to expose a corresponding blank segment on the copy sheet. Using the removed stencil segment as a guide, the child colors in the blank segment of the copy sheet to match, as best he can, the portion of the artwork appearing on the removed segment. This operation is subsequently repeated until all stencil segments on the master sheet are removed and the artwork is reproduced on the copy sheet.

BRIEF DESCRIPTION OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
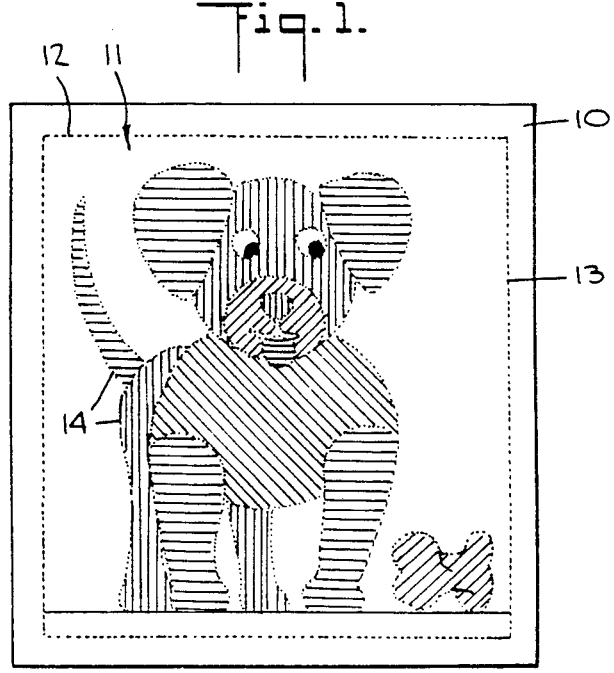
FIG. 1 is a plan view of a master sheet having a dissected artwork printed thereon, this master sheet being included in an art craft kit in accordance with the invention.

Referring now to FIG. 1, there is shown a master sheet 10 which is included in an art craft kit in accordance with the invention. Sheet 10 is of thin, good quality paper having a pressure-sensitive adhesive backing. The adhesive has light tack characteristics and is preferably of the type used in the well known POSTEM sheets marketed by 3M Corporation. Thus when the master sheet is adhered to a copy sheet, the sheet or any segment cut out therefrom may be removed without difficulty.

Printed on master sheet 10 is an artwork 11, the artwork being confined within a rectangular border defined by vertical and horizontal perforated lines 12 and 13. The perforations are very fine, adjacent holes in the line being bridged by a tiny strip of thin paper. The artwork can be a reproduction of a multi-colored professional painting, or, as previously explained, a multicolor map, or a drawing used as a teaching aid in human anatomy or in any other subject of study.

The artwork is dissected into stencil segments, the periphery of each segment being outlined by contoured lines of perforation 14.

The size and shape of the different stencil segments which together make up the artwork depend on the nature of the artwork. The term stencil segment signifies that when a particular segment is separated from the artwork on the master sheet and removed therefrom, this creates a shaped opening in the master sheet which acts as a stencil through which one can apply paint, ink or crayon to a corresponding segment, on a copy sheet or substrate underlying the opening.

In dissecting an artwork into stencil segments, it is desirable that the segments conform, when possible, to the shape of the portion of the artwork encompassed by the segment. Thus if an artwork includes a human figure having a colored torso, this torso may form one stencil segment of the dissected artwork.

Figure 2:
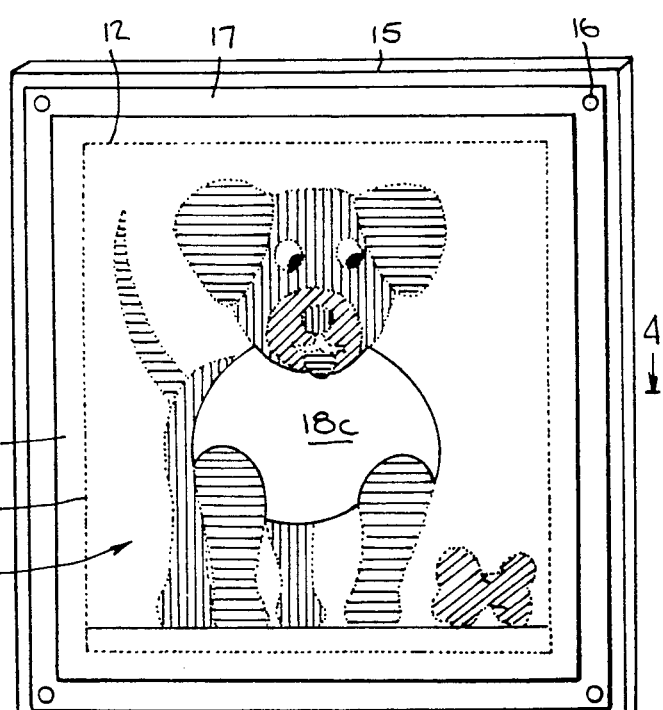
FIG. 2 is a perspective view of a backboard having a copy sheet attached thereto to whose face is adhered a master sheet, one of the stencil segments having been cut out and removed to expose a corresponding blank segment on the copy sheet.
Figure 4:
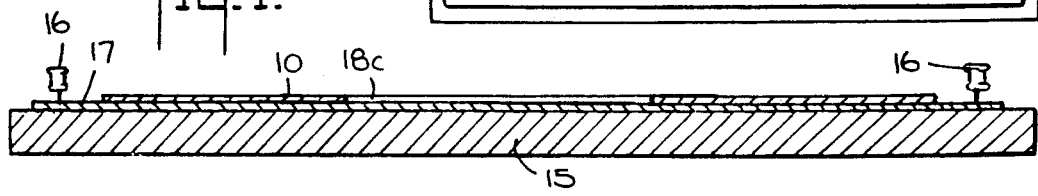
FIG. 4 is a transverse section taken through FIG. in the plane indicated by line 4—4.

Also included in the kit, as shown in FIG. 2, is a rigid backboard 15 which may be of wood or other material having a smooth, hard face. Pinned to the backboard 15 at its corners by pins 16 or other means is a copy sheet 17 of relatively heavy paper, stiff canvas or other suitable material which can be drawn on with crayon or painted with ink paints. The master sheet 10 is adhered to the face copy sheet 17.

Figure 3:
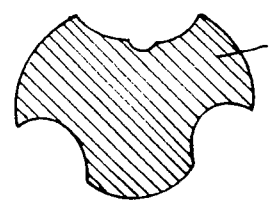
FIG. 3 illustrates the removed stencil segment.

In order to reproduce on copy sheet 17 the artwork illustrated on the master sheet, the child, by means of a ball point pen or other pointed tool, runs the point along the contoured perforated line 14 on the thin paper of the master sheet which defines the periphery of a selected stencil segment, so as to cut the thin paper bridges between the perforations and thereby separate the selected segment from the master sheet. The separated segment 18, as shown in FIG. 3, is removed from the master sheet and put to one side, thereby exposing on the copy sheet 17 a corresponding blank segment 18C.

At the outset, the child can remove whatever stencil segment from the master sheet he wishes. He is likely to remove that segment he thinks is easiest to copy. The child, using the removed stencil segment as his guide, then proceeds by means of crayons or paints, to color in the exposed corresponding blank segment on the copy sheet to produce as good a copy as he can make of the small portion of the total artwork appearing on the removed segment.

Because the child is only called up to match in terms of color and form a small dissected portion of the total artwork, it lies within the skill of a typical child to carry out the operation. In practice, the printed artwork may be composed of simple, multi-colored, cartoon-like figures, so that each dissected stencil segment has only one color. In that case, all the child need do after removing a segment from the master sheet is to apply the same color to the blank corresponding segment on the copy sheet. But the artwork may be of greater complexity and more challenging to the child. Thus in this complex artwork, many of the segments may include shaped forms in different colors, requiring the child to copy this on the corresponding blank segment.

Upon finishing his copy of a removed segment, the child then with his pointed tool cuts out and removes a second stencil segment, and makes a copy thereof. It is preferable that the second segment be adjacent the previously removed segment, for then if a particular color or form appears on the copy made of the first segment and this color or form is extended to the second segment, the child can provide proper continuity between the two segment copies. However, the child can remove the segments from the master sheet in any desired sequence and copy these segments on the copy sheet until all segments are removed and the reproduction of the artwork is completed.

In a boxed art craft kit in accordance with the invention, a stack of master sheets may be included in the package, the master sheets having different artworks printed thereon of progressively greater complexity. In this way, the child can start to learn his craft with a simple artwork that is easy to reproduce and work his way up to artworks that are increasingly difficult to reproduce. And the boxed kit also includes a stack of copy sheets, crayons, oil paints and water soluble inks, as well as a backboard, so that the child is provided with all necessary equipment.

While there has been shown and described a preferred embodiment of and art craft kit in accordance with the invention, it will be appreciated that many changes and modifications may be made therein without, however, departing from the essential spirit thereof. Thus instead of a master sheet made of paper, it may be made of thin, plastic, flexible film material, such as PVC, that has a printable face.

We claim:

1. An art craft technique for reproducing a multi-colored artwork, comprising the steps of:
   (a) printing the artwork on a master sheet;
   (b) dissecting the artwork on the master sheet into a plurality of interfitting stencil segments, each of which is outlined by a contoured line, each segment displaying a small portion which has at least one color therein of the total artwork;
   (c) securing the master sheet to the face of a blank copy sheet;
   (d) cutting out one at a time along said contoured line each of said stencil segments from the master sheet and removing each cut out segment from the master sheet to expose a corresponding blank segment of the copy sheet, each removed segment being retained to serve as a guide; and
   (e) while using each removed segment as a guide, coloring in the corresponding blank segment to reproduce on the copy sheet the portion of the artwork as defined by the colors therein appearing on the removed segment until all of the removed segments are copied on the copy sheet to complete the reproduction of the artwork.

2. A technique as set forth in claim 1, wherein said master sheet has a pressure-sensitive adhesive backing so that when placed over the copy sheet, it adheres thereto and can be removed therefrom.

3. A technique as set forth in claim 2, wherein said contoured line of each stencil segment is perforated so that if can be cut with a pointed tool.

* * * * *